United States Patent
Ahn et al.

(10) Patent No.: US 9,723,633 B2
(45) Date of Patent: *Aug. 1, 2017

(54) METHOD FOR TRANSMITTING PACKETS IN A MOBILE STATION

(71) Applicant: LG ELECTRONICS INC., Seoul (KR)

(72) Inventors: Joon Kui Ahn, Anyang-si (KR); Young Woo Yun, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,591

(22) Filed: Oct. 6, 2015

(65) Prior Publication Data

US 2016/0029416 A1     Jan. 28, 2016

Related U.S. Application Data

(63) Continuation of application No. 14/307,270, filed on Jun. 17, 2014, now Pat. No. 9,173,236, which is a (Continued)

(30) Foreign Application Priority Data

Jan. 9, 2008     (KR) .................... 10-2008-0002630

(51) Int. Cl.
*H04W 74/08*     (2009.01)
*H04W 28/04*     (2009.01)
(Continued)

(52) U.S. Cl.
CPC ....... *H04W 74/0833* (2013.01); *H04L 1/1812* (2013.01); *H04W 28/044* (2013.01); *H04W 72/0413* (2013.01); *H04W 72/1257* (2013.01); *H04W 72/1268* (2013.01); *H04W 74/085* (2013.01); *H04W 74/0866* (2013.01);
(Continued)

(58) Field of Classification Search
None
See application file for complete search history.

(56) References Cited

U.S. PATENT DOCUMENTS 6,888,882 B1     5/2005 Dogan
7,027,415 B1     4/2006 Dahlby et al.
(Continued)

FOREIGN PATENT DOCUMENTS

KR     10-2007-0080545 A     8/2007
KR     10-2008-0002901 A     1/2008

*Primary Examiner* — Min Jung
(74) *Attorney, Agent, or Firm* — Birch, Stewart, Kolasch & Birch, LLP

(57) ABSTRACT

A method of performing uplink transmission at a user equipment (UE) is provided. The UE determines whether a hybrid automatic repeat request (HARQ) retransmission collides with a transmission for a random access in a time interval, and performs the HARQ retransmission when the HARQ retransmission does not collide with the transmission for random access in the time interval. A current value of information indicating a redundancy version (RV) for the HARQ retransmission is incremented by 1 when the HARQ retransmission does not collide with the transmission for random access in the time interval.

14 Claims, 8 Drawing Sheets

Related U.S. Application Data continuation of application No. 13/932,868, filed on Jul. 1, 2013, now Pat. No. 8,787,326, which is a continuation of application No. 12/681,734, filed as application No. PCT/KR2008/007797 on Dec. 30, 2008, now Pat. No. 8,498,274.

(51) Int. Cl.

| | | |
|---|---|---|
| *H04W 72/12* | (2009.01) | |
| *H04L 1/18* | (2006.01) | |
| *H04W 28/26* | (2009.01) | |
| *H04W 72/04* | (2009.01) | |
| *H04L 5/00* | (2006.01) | |
| *H04W 88/02* | (2009.01) | |

(52) U.S. Cl.
CPC ............ *H04L 5/0058* (2013.01); *H04W 28/04* (2013.01); *H04W 28/26* (2013.01); *H04W 72/04* (2013.01); *H04W 88/02* (2013.01)

(56) References Cited

U.S. PATENT DOCUMENTS

| | | |
|---|---|---|
| 7,263,377 B1 | 8/2007 | Wahlstrom et al. |
| 8,031,583 B2 | 10/2011 | Classon et al. |
| 8,081,660 B2 | 12/2011 | Park et al. |
| 8,432,794 B2* | 4/2013 | Terry .................... H04L 1/0025 370/229 |
| 8,897,276 B2 | 11/2014 | Ranta-Aho et al. |
| 2005/0243788 A1 | 11/2005 | Janczak |
| 2007/0058735 A1 | 3/2007 | Ghosh |
| 2008/0043771 A1 | 2/2008 | Cho et al. |
| 2008/0316961 A1 | 12/2008 | Bertrand et al. |
| 2009/0168731 A1 | 7/2009 | Zhang et al. |
| 2009/0185540 A1 | 7/2009 | Pelletier et al. |
| 2010/0067498 A1 | 3/2010 | Lee et al. |
| 2010/0182965 A1 | 7/2010 | Sebire |
| 2013/0077520 A1 | 3/2013 | Pelletier et al. |

\* cited by examiner

METHOD FOR TRANSMITTING PACKETS IN A MOBILE STATION

CROSS-REFERENCE TO RELATED APPLICATIONS

This application is a Continuation of U.S. patent application Ser. No. 14/307,270, filed Jun. 17, 2014 (now U.S. Pat. No. 9,173,236 issued on Oct. 27, 2015), which is a Continuation of U.S. patent application Ser. No. 13/932,868, filed on Jul. 1, 2013 (now U.S. Pat. No. 8,787,326, issued on Jul. 22, 2014), which is a Continuation of U.S. patent application Ser. No. 12/681,734, filed on Apr. 5, 2010 (now U.S. Pat. No. 8,498,274, issued on Jul. 30, 2013), which is the National Phase of PCT International Application No. PCT/KR2008/007797, filed on Dec. 30, 2008, which claims priority to Korean Patent Application No. 10-2008-0002630, filed Jan. 9, 2008. The entire contents of all of the above applications are hereby incorporated by reference.

BACKGROUND OF THE INVENTION

Technical Field

The present invention relates to a $3^{rd}$ generation partnership project (3GPP) long term evolution (LTE) system, and more particularly, to a method of avoiding or adjusting collision when a resource allocated to a packet which will be transmitted by a mobile station collides with a special-purpose resource.

Background Art

In a cellular radio packet transmitting system using an orthogonal frequency division multiple access (OFDMA) scheme or a single carrier-frequency division multiple access (SC-FDMA) scheme used in uplink, uplink packets are distinguished by utilizing different time-frequency resources. In particular, in the transmission of the uplink packets of the cellular system, a base station transmits scheduling commands to mobile stations such that collision in uplink packet transmissions of different mobile stations is avoided and packet transmission suitable for a buffer state and a channel state of each mobile station is realized.

However, if an uplink packet scheduling command is transmitted in downlink whenever the uplink packet is transmitted, downlink overhead is extremely increased. Accordingly, in order to reduce downlink overhead in uplink packet transmission scheduling, a synchronous hybrid automatic repeat request (HARQ) scheme and a persistent scheduling scheme may be considered.

In the synchronous HARQ scheme, a mobile station performs a packet transmission according to a scheduling command received from a base station and performs a packet retransmission with respect to a packet for which negative acknowledgement (NACK) is received from the base station, using a previously used frequency band after a predetermined time elapses from a previous transmission timing or using a frequency band moved by the amount induced from a predetermined frequency hopping pattern if frequency hopping is further applied. Alternatively, a mobile station which receives a plurality of time-frequency resources available for a packet transmission in the future from a base station in advance, that is, a mobile station which receives persistent scheduling may perform a packet transmission using a predetermined time-frequency resource although a scheduling command is not received.

Several subpackets used for an initial transmission and a retransmission using the HARQ scheme are created from one codeword packet. The created several subpackets can be distinguished by the lengths of the subpackets and the start locations of the subpackets. A distinguishable subpacket is called a redundancy version (RV) and RV information refers to a promised start location of each RV.

A transmitter (Tx) transmits subpackets via a data channel in each HARQ transmission. At this time, the transmitter creates the RV of the subpacket for each HARQ transmission in sequence previously decided between the transmitter and a receiver or creates any RV and transmits RV information via a control channel. The receiver (Rx) maps the subpacket received via the data channel to an accurate location of a codeword packet in a predetermined RV sequence or using the RV information received via the control channel.

FIG. 1 is a view showing a HARQ transmission in case of using four fixed RV start locations. In addition, in FIG. 1, it is assumed that a static channel is used and the size of the subpacket used in each HARQ transmission is constant and is N/3. In FIG. 1, a first transmission indicates a subpacket used for an initial transmission using the HARQ scheme and the remaining transmissions indicate subpackets used for three HARQ retransmissions. In FIG. 1, N indicates the size of a circular buffer.

The base station may control a transmission of the mobile station, which receives dynamic scheduling, via an uplink scheduling command with respect to a new data packet of each mobile station, but may not transmit a scheduling command with respect to a retransmission packet. At this time, the mobile station performs a packet retransmission with respect to data, which is requested to be retransmitted from the base station, at a subframe separated from a previous packet transmission timing of the same data by a predetermined subframe interval. However, the mobile station detects whether the scheduling command is transmitted to the mobile station in downlink with respect to all the uplink subframes and performs a packet retransmission according to the command if the uplink scheduling command for the data to be retransmitted is detected.

In the persistent scheduling scheme, the base station allocates the time-frequency resource to the mobile station in a specific period in advance such that the time-frequency resource is used for the uplink packet transmission. The mobile station to which the persistent scheduling is applied may transmit an uplink packet with respect to the scheduled time-frequency resource although the scheduling command is not received.

In addition, the mobile stations in which the uplink packet transmissions are previously configured by upper-layer signaling like the persistent scheduling scheme may transmit packets using the predetermined time-frequency resources without the downlink scheduling command. When the retransmission is necessary with respect to the packets transmitted using the predetermined time-frequency resources, the synchronous HARQ operation may be applied.

A part of the uplink time-frequency resource in the cellular radio packet transmitting system may be reserved for a special purpose. As a representative example thereof, a time-frequency resource which is reserved such that the mobile stations which attempt to perform initial connection to a cell transmit a signal which is first transmitted in the cell, that is, a random access channel (RACH), may be used.

The mobile stations which attempt to perform the connection to the cell may transmit a physical RACH (PRACH) using a unit time-frequency domain occupying one or two subframes in about a 1.08-MHz band reserved for a PRACH transmission. The unit time-frequency domain for the PRACH transmission may be allocated according to one of 16 PRACH configurations shown in Table 1.

TABLE 1

| PRACH Configuration | System frame number | Subframe number |
|---|---|---|
| 0 | Even | 1 |
| 1 | Even | 4 |
| 2 | Even | 7 |
| 3 | Any | 1 |
| 4 | Any | 4 |
| 5 | Any | 7 |
| 6 | Any | 1, 6 |
| 7 | Any | 2, 7 |
| 8 | Any | 3, 8 |
| 9 | Any | 1, 4, 7 |
| 10 | Any | 2, 5, 8 |
| 11 | Any | 3, 6, 9 |
| 12 | Any | 0, 2, 4, 6, 8 |
| 13 | Any | 1, 3, 5, 7, 9 |
| 14 | Any | 0, 1, 2, 3, 4, 5, 6, 7, 8, 9 |
| 15 | Even | 9 |

In Table 1, one system frame consists of 10 subframes, and 10 subframes in the system frame are denoted by subframe numbers of 0 to 9. At this time, the frequency location for a PRACH transmission in each subframe may move according to a predetermined frequency hopping pattern.

If specific time-frequency resources are reserved for special purpose, the transmission area for retransmission packets to be transmitted by the synchronous HARQ scheme and the packets to be transmitted by the persistent scheduling scheme may collide with the time-frequency resource reserved for the special purpose.

FIG. 2 is a view showing an example in which time-frequency resources for retransmitting the packets by the synchronous HARQ scheme collide with time-frequency resources reserved for a RACH transmission.

In the example of FIG. 2, the packets are retransmitted by the synchronous HARQ scheme in the unit of four subframes. Boxes 290 occupying four resource blocks on a frequency axis indicate the time-frequency resources reserved for the RACH transmission. At this time, resources 210 and 220 allocated to an initial transmission packet and a retransmission packet are shown at the upper side of FIG. 2 and resources 230, 240 and 250 allocated to an initial transmission packet, a first retransmission packet and a second retransmission packet are shown at the lower side of FIG. 2. A RACH time-frequency resource 290 collides with a first retransmission packet 220 and a second retransmission packet 250 shown at the upper side.

SUMMARY OF THE INVENTION

An object of the present invention is to provide a method of avoiding or adjusting collision if a retransmission packet transmitted by a mobile station using a synchronous HARQ scheme or a packet transmitted using a previously allocated resource by an upper layer is overlapped with a resource reserved for another purpose in a cellular radio access method in which packet transmissions of different mobile stations are distinguished by different frequency bands in the same duration.

The object of the present invention can be achieved by providing a method of transmitting uplink data using a resource allocated to a mobile station, the method including: determining whether a resource reserved for a special purpose is overlapped with a resource for transmitting a packet by the mobile station, on the basis of resource allocation information on the mobile station; and delaying the transmission of the packet if the reserved resource is overlapped with the resource for transmitting the packet.

In the delaying of the transmission of the packet, the transmission of the whole packet may be delayed even when the resource for transmitting the packet is partially overlapped with the reserved resource.

The resource reserved for the special purpose may include a resource reserved for a random access channel (RACH) transmission.

The resource allocated to the mobile station may be allocated by a persistent scheduling scheme.

The packet may be a synchronous hybrid automatic repeat request (HARQ) retransmission packet. In the transmitting of the packet at the next retransmission timing, a redundancy version of a previous transmission timing may be transmitted at the next retransmission timing.

In another aspect of the present invention, provided herein is a method of transmitting uplink data using a resource allocated to a mobile station, the method including: determining whether a resource reserved for a special purpose is overlapped with a resource for transmitting a packet by the mobile station, on the basis of resource allocation information on the mobile station; and partially transmitting the packet using the residual resource excluding the overlapped resource if the reserved resource is partially overlapped with the resource for transmitting the packet.

The resource reserved for the special purpose may include a resource reserved for a random access channel (RACH) transmission.

In another aspect of the present invention, provided herein is a method of transmitting uplink data using a resource allocated to a mobile station, the method including: determining whether a resource reserved for a special purpose is overlapped with a resource for transmitting a packet by the mobile station, on the basis of resource allocation information on the mobile station, when system information including a collision avoidance instruction is received from a base station; and delaying the transmission of the packet if the reserved resource is overlapped with the resource for transmitting the packet.

The system information may be information broadcasted by the base station.

The resource reserved for the special purpose may include a resource reserved for a random access channel (RACH) transmission.

In another aspect of the present invention, provided herein is a method of transmitting uplink data using a resource allocated to a mobile station, the method including: determining whether a resource reserved for a special purpose is overlapped with a resource for transmitting a packet by the mobile station, on the basis of resource allocation information on the mobile station, when system information including a collision avoidance instruction is received from a base station; and partially transmitting the packet using the residual resource excluding the overlapped resource if the reserved resource is partially overlapped with the resource for transmitting the packet.

The resource reserved for the special purpose may include a resource reserved for a random access channel (RACH) transmission.

According to the embodiments of the present invention, it is possible to increase uplink packet transmission efficiency without increasing downlink overhead, by avoiding or adjusting collision of an uplink packet transmission with a time-frequency resource reserved for another purpose.

BRIEF DESCRIPTION OF DRAWINGS

The accompanying drawings, which are included to provide a further understanding of the invention, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. However, the following embodiments of the present invention may be variously modified and the range of the present invention is not limited to the following embodiments.

The embodiments of the present invention provides a method of avoiding or adjusting collision when an uplink packet transmission collides with a resource reserved for a special purpose, for example, a RACH time-frequency resource.

Figure 1:
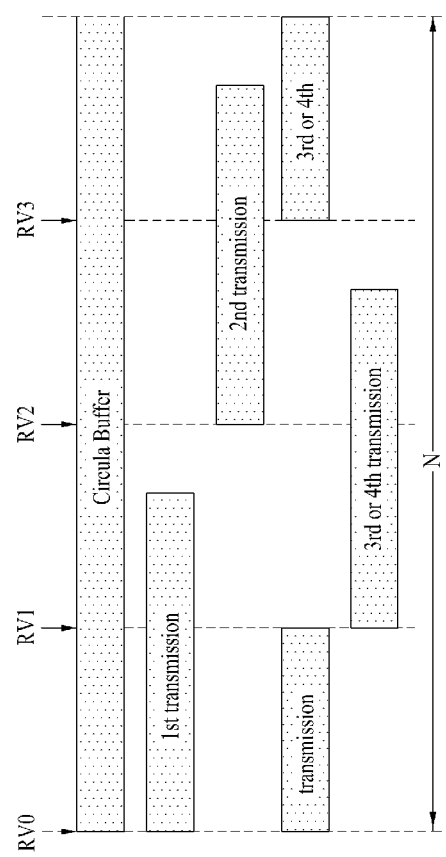
FIG. 1 is a view showing a packet transmission in case of using fixed RV start locations in a synchronous HARQ.
Figure 2:
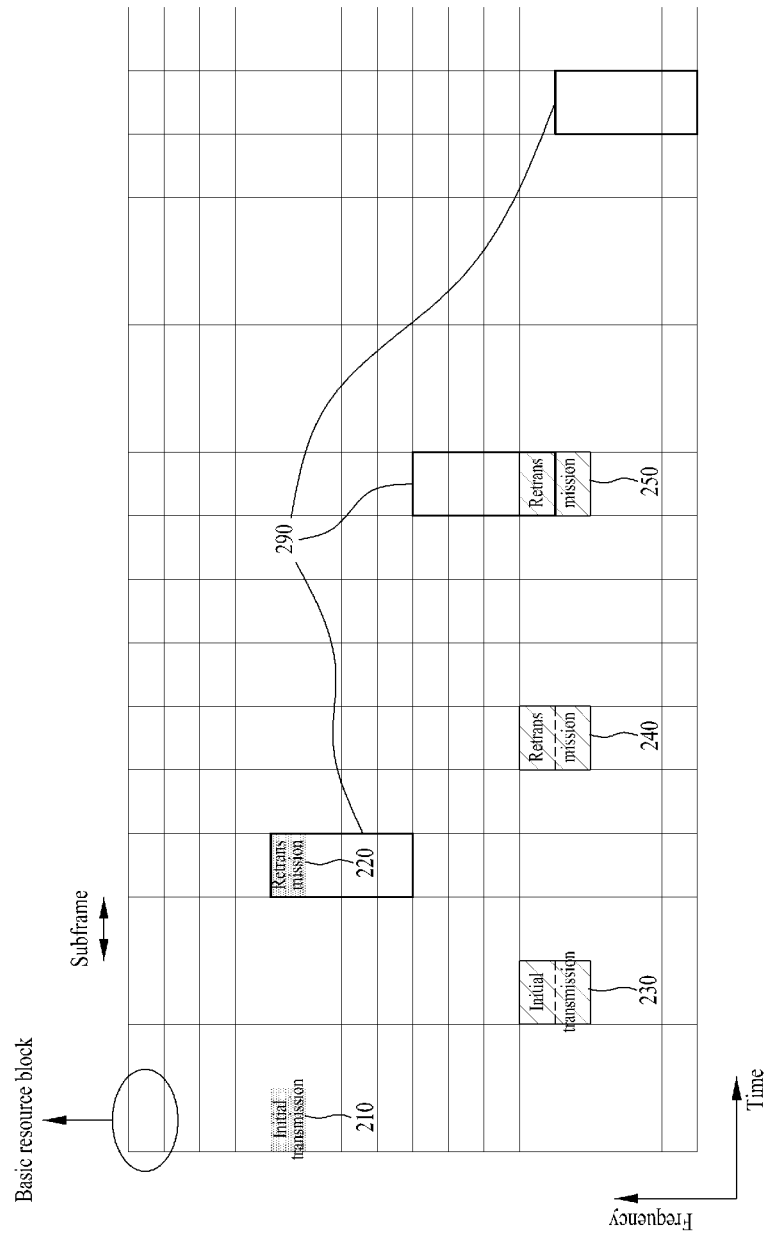
FIG. 2 is a view showing an example in which resources for retransmitting packets by a synchronous HARQ scheme collide with resources reserved for a RACH transmission.
Figure 3:
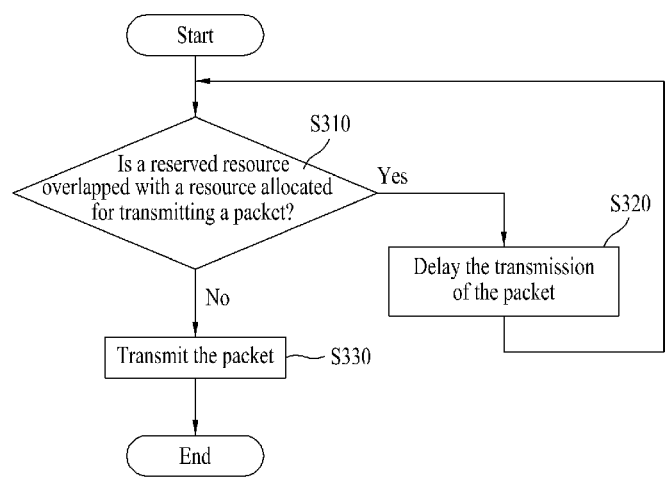
FIG. 3 is a flowchart illustrating a method of transmitting packets in a mobile station according to an embodiment of the present invention.

FIG. 3 is a flowchart illustrating a method of transmitting packets in a mobile station according to an embodiment of the present invention.

Hereinafter, it is assumed that a part of a resource necessary for the uplink transmission of the mobile station is allocated in advance like a persistent scheduling scheme, or a resource allocated to a packet which will be transmitted by the mobile station is decided according to a synchronous HARQ scheme.

It is determined whether a resource reserved for a special purpose is overlapped with a resource for transmitting a packet by the mobile station, on the basis of resource allocation information on the mobile station (S310).

At this time, if the resource reserved for the special purpose is overlapped with the resource for transmitting the packet, the transmission of the packet is delayed such that the packet is transmitted by a next allocated resource in the persistent scheduling scheme and is transmitted at a next retransmission timing in the synchronous HARQ scheme (S320). Preferably, in this step S320, even when the resource for transmitting the packet is partially overlapped with the reserved resource, the transmission of the packet may be delayed to the next retransmission timing.

At this time, if the reserved resource is not overlapped with the resource for transmitting the packet, the packet is normally transmitted (S330).

In the method of transmitting the packets in the mobile station according to the embodiment of the present invention, the uplink retransmission packet transmission colliding with the special-purpose time-frequency resource is delayed to a next synchronous HARQ transmission timing. Alternatively, if the same time-frequency resource as the special-purpose time-frequency resource is allocated by the persistent scheduling scheme, the packet is not transmitted by that time-frequency resource.

Figure 4:
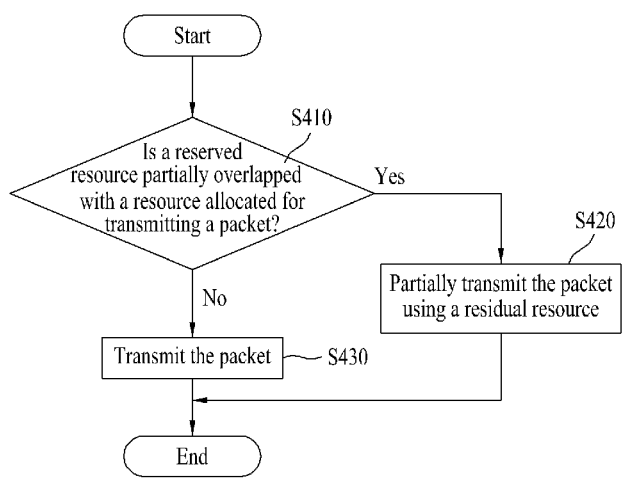
FIG. 4 is a flowchart illustrating a method of transmitting packets in a mobile station according to another embodiment of the present invention.

FIG. 4 is a flowchart illustrating a method of transmitting packets in a mobile station according to another embodiment of the present invention.

It is determined whether a resource reserved for a special purpose is overlapped with a resource for transmitting a packet by the mobile station, on the basis of resource allocation information on the mobile station (S410).

At this time, if the resource reserved for the special purpose is partially overlapped with the resource allocated to the packet, the packet is partially transmitted using the residual resource excluding the overlapped resource (S420). Preferably, in this step S420, if the reserved resource is entirely overlapped with the resource allocated to the packet, the transmission of the packet is delayed such that the packet is transmitted by a next allocated resource in the persistent scheduling scheme and is transmitted at a retransmission timing in the synchronous HARQ scheme.

The method of partially transmitting the packet using the residual resource is, for example, as follows: a first method of extracting a complete packet which will be transmitted at a retransmission timing from a buffer and removing a part overlapped with the reserved resource from the extracted packet; and a second method of extracting a short packet in consideration of a part overlapped with the reserved resource when a complete packet which will be transmitted at a retransmission timing is extracted from a buffer. However, these methods are only exemplary and the method of partially transmitting the packets if the reserved resource is partially overlapped with the resource allocated to the packet according to the embodiment of the present invention is not limited to the above-described methods.

If the reserved resource is not overlapped with the resource allocated to the packet, the packet is normally transmitted (S430).

A RACH signal is not always transmitted by the time-frequency resource reserved for a RACH transmission and a probability in which the RACH signal is transmitted is changed according to the number of mobile stations which attempt to access a cell. Accordingly, collision may be ready to be endured instead of avoiding the transmission of the packet by the mobile station using the RACH time-frequency resource. Alternatively, the base station may transmit a scheduling command to the mobile station with respect to the time-frequency resources, in which collision is expected to occur, such that the collision does not occur.

Hereinafter, a method of, at the base station, informing a mobile station or all mobile stations in a cell whether or not the packet transmission using the time-frequency resource reserved for the RACH is avoided via signaling of at least one bit.

Figure 5:
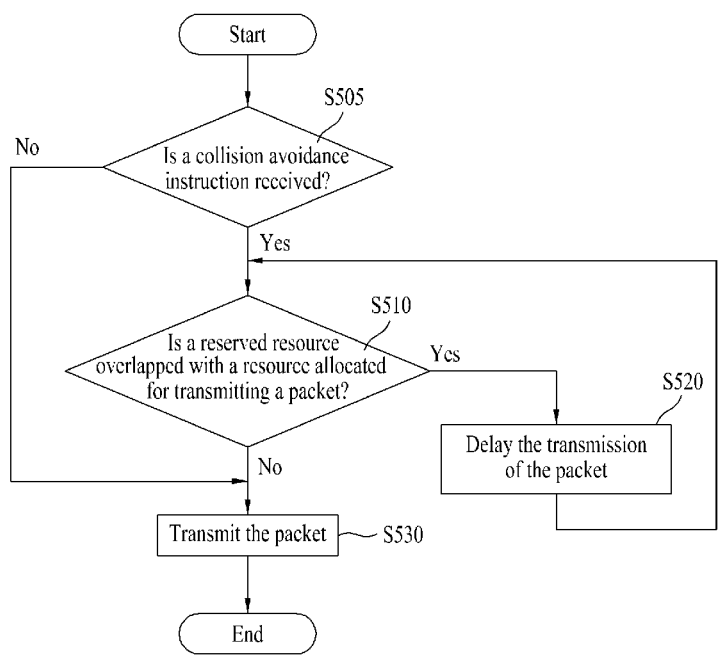
FIG. 5 is a flowchart illustrating a method of transmitting packets in a mobile station according to another embodiment of the present invention.

FIG. 5 is a flowchart illustrating a method of transmitting packets in a mobile station according to another embodiment of the present invention.

First, it is determined whether system information including a collision avoidance instruction is received from the base station (S505). The collision avoidance instruction indicates the signaling of the base station.

If the mobile station receives the system information including the collision avoidance instruction, it is determined whether a resource reserved for a special purpose is overlapped with the resource for transmitting the packet by the mobile station, on the basis of resource allocation information on the mobile station (S510). If the mobile station does not receive the system information including the collision avoidance instruction, the packet is normally transmitted at a transmission timing (S530).

At this time, if the reserved resource is overlapped with the resource allocated to the packet, the transmission of the packet is delayed such that the packet is transmitted by a next allocated resource in the persistent scheduling scheme and is transmitted at a next retransmission timing in the synchronous HARQ scheme (S520).

At this time, if the reserved resource is not overlapped with the resource allocated to the packet, the packet is normally transmitted (S530).

Figure 6:
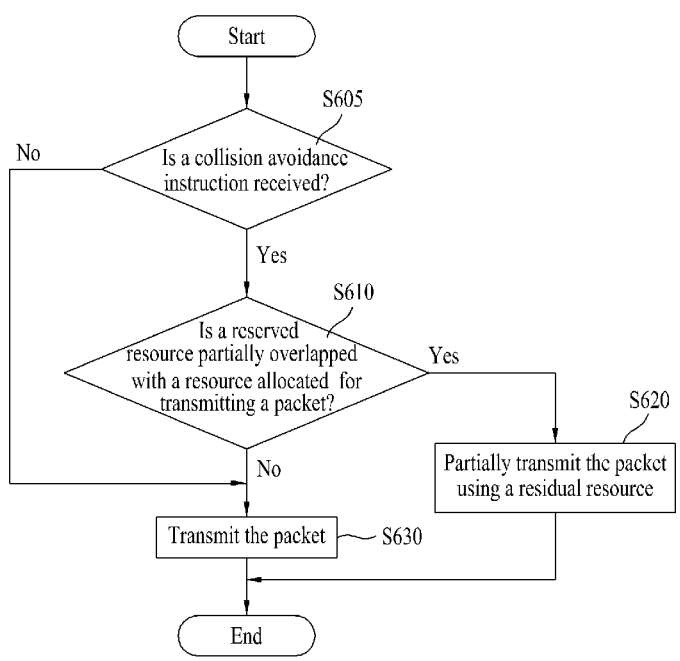
FIG. 6 is a flowchart illustrating a method of transmitting packets in a mobile station according to another embodiment of the present invention.

FIG. 6 is a flowchart illustrating a method of transmitting packets in a mobile station according to another embodiment of the present invention.

First, it is determined whether system information including a collision avoidance instruction is received from the base station (S605). The collision avoidance instruction indicates the signaling of the base station.

If the mobile station receives the system information including the collision avoidance instruction, it is determined whether a resource reserved for a special purpose is overlapped with the resource for transmitting the packet by the mobile station, on the basis of resource allocation information on the mobile station (S610). If the mobile station does not receive the system information including the collision avoidance instruction, the packet is normally transmitted at a transmission timing (S630).

At this time, if the reserved resource is partially overlapped with the resource allocated to the packet, the packet is partially transmitted using the residual excluding the overlapped resource (S620).

At this time, if the reserved resource is not overlapped with the resource allocated to the packet, the packet is normally transmitted (S630).

Figure 7:
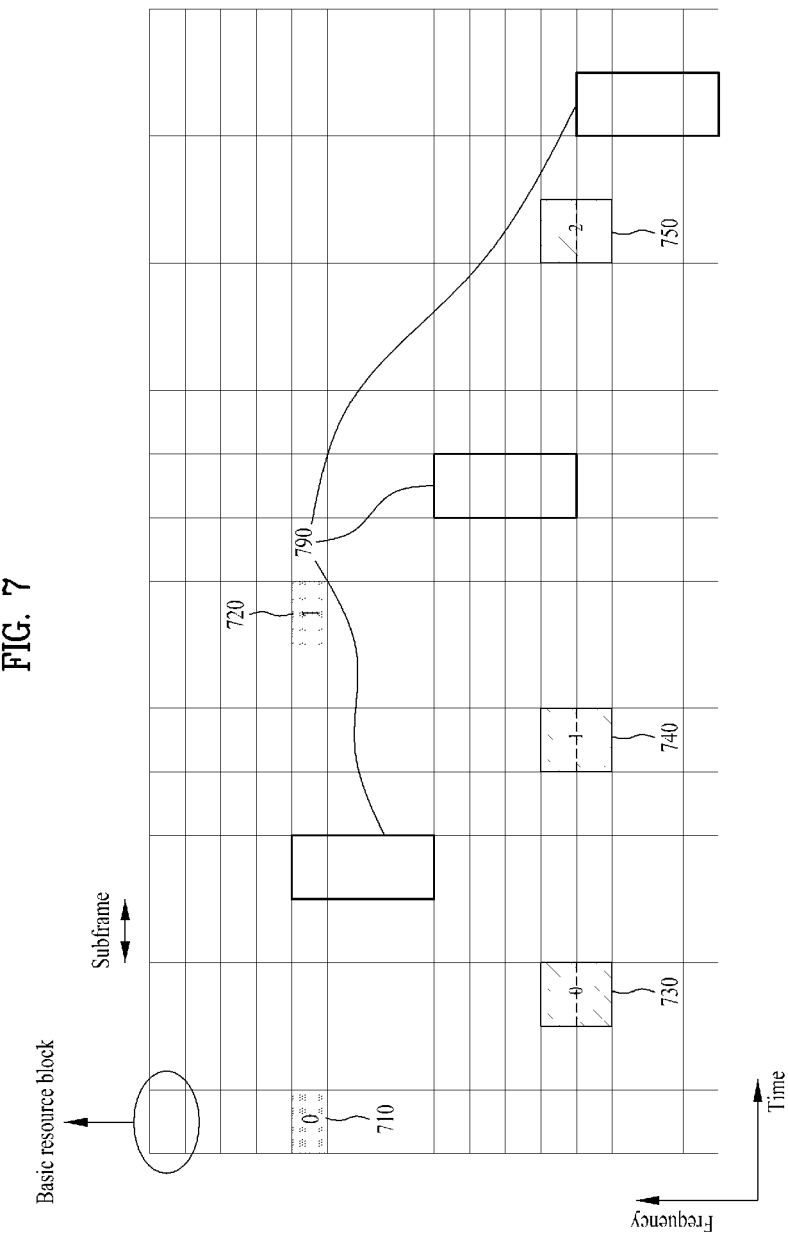
FIG. 7 is a view showing an example of transmitting packets according to the method of FIG. 3.

FIG. 7 is a view showing an example of transmitting synchronous HARQ retransmission packets according to the method of FIG. 3.

Figure 8:
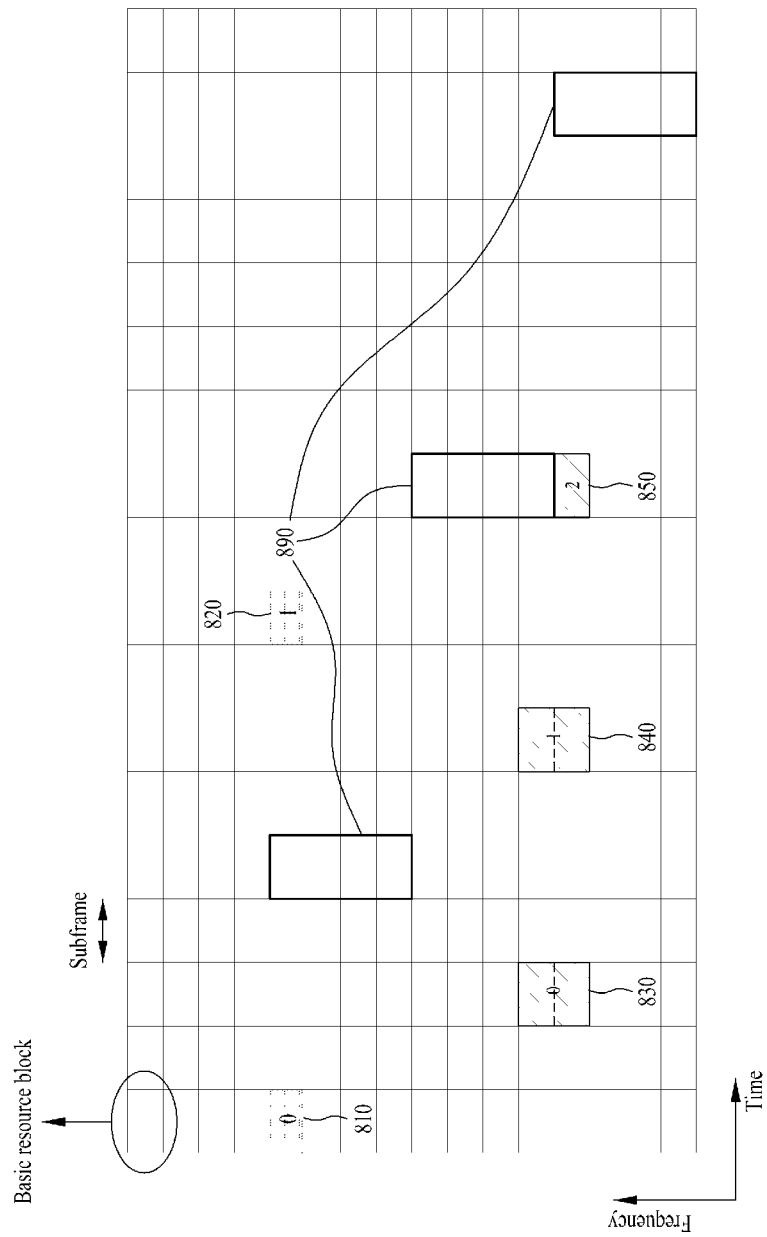
FIG. 8 is a view showing an example of transmitting packets according to the method of FIG. 4.

In the examples of FIGS. 7 and 8, each packet is retransmitted by the synchronous HARQ scheme in the unit of four subframes.

In FIG. 7, boxes 790 occupying four resource blocks on a frequency axis indicate time-frequency resources reserved for a RACH transmission. At this time, resources 710 and 720 allocated to an initial transmission packet and a retransmission packet are shown at the upper side of FIG. 7 and resources 730, 740 and 750 allocated to an initial transmission packet, a first retransmission packet and a second retransmission packet are shown at the lower side of FIG. 7.

The first retransmission packet 720 of the upper side and the second retransmission packet 750 of the lower side colliding with the RACH time-frequency resource 790 are not transmitted at a current transmission timing and are transmitted at a next retransmission timing.

In case that retransmission packet at a mobile station is decided to be a certain part of whole coding data in consideration of retransmission timing (e.g., HARQ scheme defining RV is used), the coding data to be transmitted by the delayed retransmission packet may be decided on the same criterion as the case where the packet transmission is not delayed. In FIG. 7, numerals denoted in the packets represent the RV and RV=0, RV=1, RV=2, . . . indicate coding data parts which are previously decided to be transmitted at an initial transmission timing, a first retransmission timing, a second retransmission timing, . . . .

In the packet transmission in which the time-frequency for the packet partially collides with the special-purpose time-frequency resource, a part of the whole coding data may be transmitted using the time-frequency resource which does not collide.

FIG. 8 is a view showing an example of transmitting a synchronous HARQ retransmission packet according to the method of FIG. 4.

In FIG. 8, boxes 890 occupying four resource blocks on a frequency axis indicate time-frequency resources reserved for a RACH transmission. At this time, resources 810 and 820 allocated to an initial transmission packet and a retransmission packet are shown at the upper side of FIG. 8 and resources 830, 840 and 850 allocated to an initial transmission packet, a first retransmission packet and a second retransmission packet are shown at the lower side of FIG. 8.

In order to prevent collision with the RACH time-frequency resource 890, the first retransmission packet 820 of the upper side is transmitted at a next retransmission timing. Meanwhile, if a partial time-frequency resource for the second retransmission packet 850 is overlapped with the RACH time-frequency resource 890, the transmission of the packet is not delayed and a part of the packet is transmitted using the residual resource excluding the overlapped resource.

In this case, when the HARQ scheme, that decides which part of whole coding data corresponds to the packet to be retransmitted by the mobile station in consideration of retransmission timings, is used, the existing scheme may be applied without alteration. The second retransmission packet 850 of the lower side of FIG. 8 may be retransmitted in the existing RV sequence even when the time-frequency resource available for the retransmission is reduced compared with a previous transmission like the retransmission of a packet of RV=2. At this time, each RV is defined regardless of the size of the transmission packet, like a start bit location in the whole coding data bit stream.

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The above embodiments of the present invention have been described focusing mainly on the data communication relationship between a mobile station and a Base Station (BS). Specific operations which have been described as being performed by the BS may also be performed by upper nodes as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "mobile station" may also be replaced with another term such as "user equipment (UE)", "terminal", or "mobile subscriber station (MSS)".

The embodiments of the present invention can be implemented by hardware, firmware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various the embodiments of the present invention may also be implemented in the form of software modules, processes, functions, or the like which perform the features or operations described above. Software code can be stored in a memory unit so that it can be executed by a processor. The memory unit may be located inside or outside the processor and can communicate data with the processor through a variety of known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention provides a method of avoiding or adjusting collision when a resource allocated to a packet which will be transmitted by a mobile station collides with a special-purpose resource. The present invention is applicable to a device associated with a mobile communication system, such as a mobile station or a base station, and an algorithm associated therewith.

The invention claimed is:

1. A method for performing an uplink transmission, the method comprising:
   determining, by a user equipment (UE), whether or not a hybrid automatic repeat request (HARQ) retransmission collides with a transmission for random access in a time interval; and
   performing, by the UE, the HARQ retransmission when the HARQ retransmission does not collide with the transmission for random access in the time interval,
   wherein a current value of information indicating a redundancy version (RV) for the HARQ retransmission is incremented by 1 when the HARQ retransmission does not collide with the transmission for random access in the time interval.

2. The method according to claim 1, further comprising:
   performing the transmission for random access and skipping the HARQ retransmission when the HARQ retransmission collides with the transmission for random access in the time interval.

3. The method according to claim 1, further comprising:
   when the HARQ retransmission collides with the transmission for random access in the time interval, performing the HARQ retransmission in a next retransmission time interval.

4. The method according to claim 3, wherein the HARQ retransmission in the next retransmission time interval is performed on a same resource as previously assigned.

5. The method according to claim 3, wherein the HARQ retransmission in the next retransmission time interval is performed according to an uplink scheduling command detected in the next retransmission time interval.

6. The method according to claim 1, wherein the time interval corresponds to a subframe.

7. The method according to claim 1, wherein the information indicating the RV has a value of 0 for an initial HARQ transmission.

8. A user equipment configured to perform an uplink transmission, the user equipment comprising:
   a memory; and
   a processor operatively connected to the memory and configured to:
   determine whether or not a hybrid automatic repeat request (HARQ) retransmission collides with a transmission for random access in a time interval, and
   perform the HARQ retransmission when the HARQ retransmission does not collide with the transmission for random access in the time interval,
   wherein a current value of information indicating a redundancy version (RV) for the HARQ retransmission is incremented by 1 when the HARQ retransmission does not collide with the transmission for random access in the time interval.

9. The user equipment according to claim 8, wherein the processor is further configured to:
   perform the transmission for random access and skip the HARQ retransmission when the HARQ retransmission collides with the transmission for random access in the time interval.

10. The user equipment according to claim 8, wherein the processor is further configured to:
    perform the HARQ retransmission in a next retransmission time interval when the HARQ retransmission collides with the transmission for random access in the time interval.

11. The user equipment according to claim 10, wherein the HARQ retransmission in the next retransmission time interval is performed on a same resource as previously assigned.

12. The user equipment according to claim 10, wherein the HARQ retransmission in the next retransmission time interval is performed according to an uplink scheduling command detected in the next retransmission time interval.

13. The user equipment according to claim 8, wherein the time interval corresponds to a subframe.

14. The user equipment according to claim 8, wherein the information indicating the RV has a value of 0 for an initial HARQ transmission.

* * * * *